(12) United States Patent
Khanna et al.

(10) Patent No.: US 7,734,519 B1
(45) Date of Patent: Jun. 8, 2010

(54) SYSTEMS AND METHODS FOR SECURITIZED FINANCING OF ASSETS

(75) Inventors: Sanjeev Khanna, Allendale, NJ (US); Garth D. Williams, New York, NY (US); Charles Atkins, New York, NY (US)

(73) Assignee: Morgan Stanley, New York, NY (US)

( * ) Notice: Subject to any disclaimer, the term of this patent is extended or adjusted under 35 U.S.C. 154(b) by 184 days.

(21) Appl. No.: 11/374,860

(22) Filed: Mar. 14, 2006

(51) Int. Cl.
  *G06Q 40/00* (2006.01)
(52) U.S. Cl. .............................................. 705/35
(58) Field of Classification Search .................. 705/35
  See application file for complete search history.

(56) References Cited

U.S. PATENT DOCUMENTS 6,154,730 A * 11/2000 Adams et al. ............. 705/36 R
2006/0293985 A1* 12/2006 Lederman et al. ............. 705/35

OTHER PUBLICATIONS

"Fitch Rates SBA CMBS Trust, Series 2005-1," Business Wire, New York, Nov. 18, 2005, p. 1.*
Pavel, Christine A., "Structures and Cash Flow," chapter in "Asset Securitization Principles and Practice," Executive Enterprises, Inc., New York, 1990, pp. 49-66.*
Prendergast, James D., and Pearson, Keith, "How to Perfect Equity Collateral Under Article 8," The Practical Real Estate Lawyer, Philadelphia, Nov. 2004, vol. 20, Iss. 6, pp. 33-50.*
Berman, Andrew R., "'Once a Mortgage, Always a Mortgage'—The Use (and Misuse of) Mezzanine Loans and Preferred Equity Investments," Stanford Journal of Law, Business & Finance, Autumn 2005, vol. 11, Iss. 1, pp. 76-125.*
Downes, John; Goodman, Jordan Elliott, Dictionary of Finance and Investment Terms, 1998, Barron's Financial Guides, Fifth Edition, p. 551.*
Frankel, Tamar, "Securitization: Structured Financing, Financial Assets Pools, and Asset-Backed Securities," 1991 (and 2001 Supplement), Little, Brown and Company, Sections 1.1, 7.23.5.3, 20.17.*

* cited by examiner

*Primary Examiner*—Charles R Kyle
*Assistant Examiner*—David L Wood
(74) *Attorney, Agent, or Firm*—K&L Gates LLP

(57) ABSTRACT

A securitization structure for raising capital, where notes issued under the structure are backed by a plurality of real property assets. The structure includes one or more asset holders that hold a plurality of real property assets. The structure also includes one or more issuers that issue notes to noteholders, wherein the notes are supported by the real property assets including cash flows therefrom, but where the noteholders do not have the benefit of a material amount of security interests in the plurality of real property assets, wherein at least one title insurance policy exists for the benefit of noteholders with respect to one or more of the plurality of real property assets that are not subject to a security interest for the benefit of the noteholders, and wherein the noteholders have the benefit of a security interest in the equity interests of the one or more asset holders that are pledged as security for the notes.

18 Claims, 3 Drawing Sheets

SYSTEMS AND METHODS FOR SECURITIZED FINANCING OF ASSETS

BACKGROUND

Entities, for example those having significant interests in real property, may use CMBS (commercial mortgage backed securities) structures or other ABS (asset-backed securities) structures, to raise capital. Such pre-existing structures have secured the issued securities (notes) by at least requiring mortgages on the real property for the benefit of the noteholders. In the event of default on the notes, such mortgages enable the noteholders to foreclose on the underlying real property pursuant to their senior security interests in such real property. In addition, lender's title insurance policies may be available in respect to real properties that are subject to mortgages, further protecting the noteholders. In a structure such as the foregoing, an entity owning a large number of properties would need to establish a large number of mortgages, entailing a significant expenditure of resources in terms of time and cost. An improved structure for securitizing a large number of real property assets is therefore desired.

SUMMARY

In one embodiment, the present invention is directed to a securitization structure for raising capital, where notes issued under the structure are backed by a plurality of real property assets. The structure includes one or more asset holders that hold a plurality of real property assets. The structure also includes one or more issuers that issue notes to noteholders, wherein the notes are supported by the real property assets including cash flows therefrom, but where the noteholders do not have the benefit of a material amount of security interests in the plurality of real property assets, wherein at least one title insurance policy exists for the benefit of noteholders with respect to one or more of the plurality of real property assets that are not subject to a security interest for the benefit of the noteholders, and wherein the noteholders have the benefit of a security interest in the equity interests of the one or more asset holders that are pledged as security for the notes.

BRIEF DESCRIPTION OF THE DRAWINGS

Further advantages of the present invention may be better understood by referring to the following description taken in conjunction with the accompanying drawings, in which.

DESCRIPTION

Figure 1:
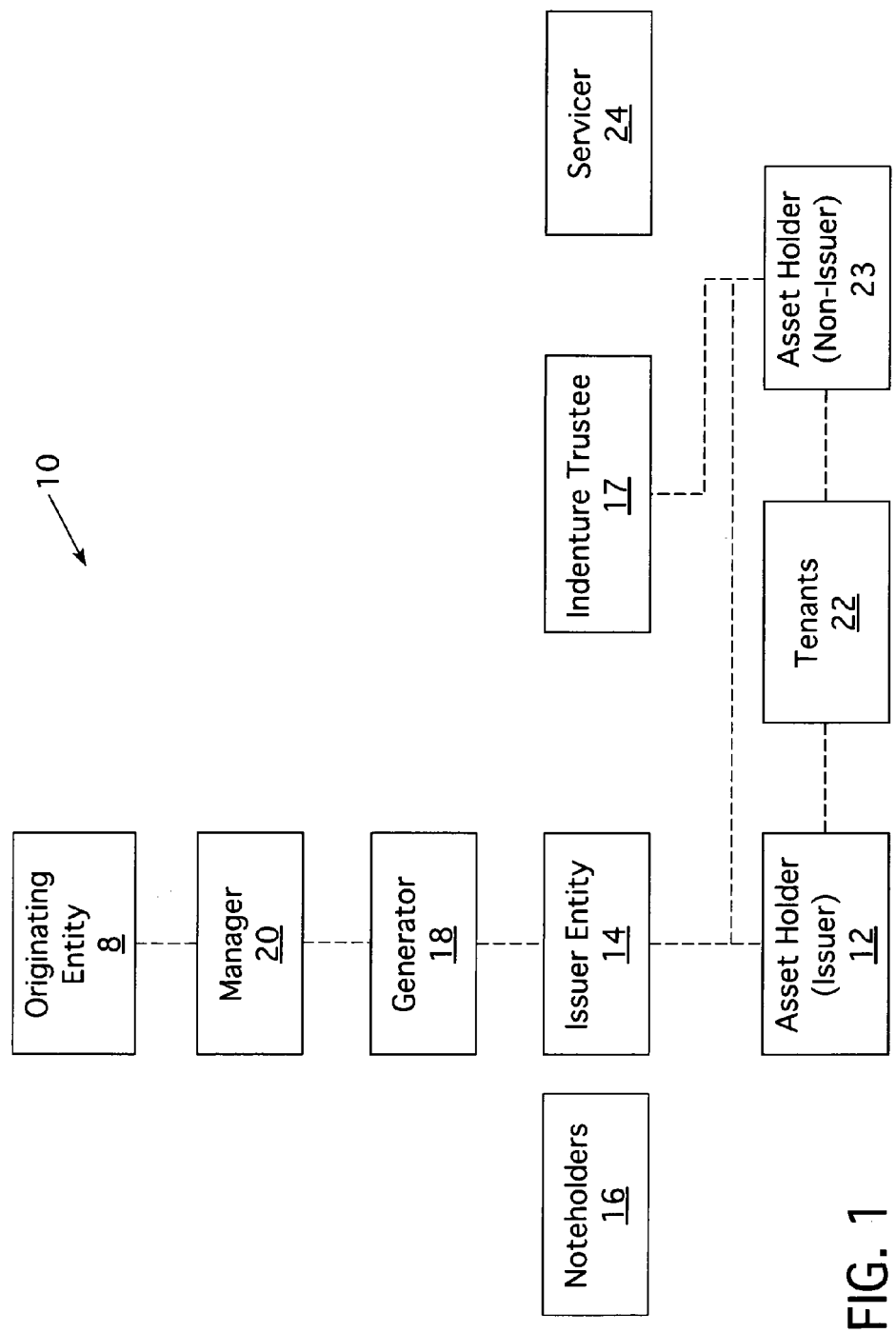
FIG. 1 is a diagram illustrating a structure that may be used in conjunction with capitalizing according to one embodiment of the present invention.

FIG. 1 is a diagram illustrating a structure 10 that may be used by an originating entity 8 for raising capital according to one embodiment of the present invention. The originating entity 8 may be one or more entities that, prior to an asset-backed securitization transaction, directly or indirectly owned rights in assets that are identified to become part of the securitization structure. In the structure 10, an asset holder 12 may be one or more entities that hold assets including real property that are the subject of a securitization. In various embodiments, each asset holder 12 is a special purpose entity (SPE) that has no employees, is prohibited from owning assets other than those contemplated by the structure 10, and is prohibited from incurring debt outside the parameters of the structure 10. An issuer entity 14 is an SPE that owns, directly or indirectly, all of the equity interests of asset holder(s) 12. The issuer entity 14 may be prohibited from acquiring other assets or incurring any liabilities and may have no employees. The issuer entity 14 and the asset holder(s) 12 (together "the issuers") will issue notes to investors (noteholders) 16. The notes are obligations of the issuers 12, 14 and are to be paid from the assets and cash flows of the issuers 12, 14. The notes may be issued in one or more classes (tranches). The noteholders 16 have rights to receive payments of principal and interest, and such rights may be subordinate to those of other noteholders depending on the class of note. In certain embodiments, no principal payment will be made prior to an "Anticipated Prepayment Date" (i.e., a date with respect to any class of notes, on which payment in full is expected to occur for the notes of such class, assuming that the class of notes is not prepaid in whole or part prior to such date), except that if an "Amortization Period" (as described hereafter) commences, the issuers will be required to make principal payments on the notes out of "Excess Cash Flow" (as described hereafter). In certain embodiments, the notes will be issued, on a closing date of the securitization, pursuant to an indenture for which there is an indenture trustee 17.

The assets of the asset holder(s) 12 generate cash flows (referred to herein as "rents") from fees received from third parties (referred to herein as tenants 22) pursuant to leases, subleases, licenses, sublicenses or other agreements ("rent agreements") relating to use of the assets. For example, in one embodiment, the asset holder(s) 12 own (in fee or under long-term easements), lease or sublease from third parties, sites on which wireless communications towers are located ("tower sites") and on which space is either licensed or leased pursuant to certain rent agreements ("space licenses").

The issuer entity 14 pledges the equity interests of the asset holder(s) 12 in support of the notes. In one embodiment, under the indenture, the issuers 12, 14 grant, to the indenture trustee 17 for the benefit of the noteholders 22, a first priority security interest in all of their assignable personal property and in the rent agreements (e.g., the space licenses) and revenues pursuant thereto, both presently existing and any that may exist in the future. In this embodiment, the issuer entity 14 pledges: (i) all of its distributions received from the asset holder(s); and (ii) all of its equity interests in the asset holder(s) 12 as security for repayment of the notes. In accordance with the structure of the present invention, no mortgages need be executed and no fixture filings need be made with respect to the underlying real property assets of the asset holder(s) 12. Eliminating mortgages in the present securitization structure achieves a considerable savings in terms of cost and complexity when there are a large number of properties involved in the securitization (e.g., thousands of tower sites).

Those security interests contemplated herein (e.g., in the issuers' 12, 14 personal property) may be perfected, for example, by the filing of finance statements under the Uniform Commercial Code in the jurisdiction where the asset holder 14 is incorporated or organized. By virtue of such perfection, the indenture trustee's 17 security interest may have priority over a subsequent judgment lien and may be protected from avoidance by a trustee in bankruptcy. Nevertheless, such filings may not be sufficient to perfect a lien on any easements, ground lease interests or other real property interests of the issuers 12, 14, or on any leases or rents attributable to such real property interests.

In certain embodiments, one or more of the asset holder(s) 12 may have restrictions (e.g., contractual restrictions) that preclude the issuance of debt, the pledging of assets and/or the admission of new members to the entity. In such cases, the asset holder 12 subject to such restrictions may not itself be an issuer (a "non-issuer asset holder 23") and will not grant security interests in its real or personal property. The notes, which are obligations of the issuers 12, 14, would then be payable from distributions paid by the non-issuer asset holder 23 as well as the assets and cash flows of the issuers 12, 14. To the extent the issuer entity 14 indirectly owns the non-issuer asset holder 23 through one or more intermediate entities, the issuer entity 14 would pledge all of its direct equity interests in the immediate parent entities of the non-issuer asset holder 23. Because of the restrictions imposed on the non-issuer asset entity 23, in the event of a realization by the indenture trustee 17 on its security interests (e.g., as a result of default), the indenture trustee 17 and its designees will not have rights to become a member of the non-issuer asset entity 23. However, through realization of the security interests held by the indenture trustee 17 in the equity interests of the immediate parent entity(ies) of the non-issuer asset holder 23, the indenture trustee 17 and its designees can control the operations of the non-issuer asset holder 23, subject to any restrictions in the organizational documents of the non-issuer asset holder 23. The issuer entity 14 may be required under the indenture to cause all distributions received by it from the non-issuer asset holder 23 to be deposited into a collection account. A non-issuer asset holder 23 will generally have contractual restrictions that prohibit sales of its assets (but not of its equity interests) with limited exceptions. Consequently, distributions paid by the non-issuer asset holder 23, but not the assets or cash flows of the non-issuer asset holder 23 support the notes.

More generally, because the indenture trustee 17 will not have a lien on any (or at least not to a material extent) real property interests associated with the asset holder(s) 12 assets (e.g., tower sites), in the event of a default, the indenture trustee 17 will be unable to foreclose directly on the personal property and fixtures located on the real property assets (e.g., located on the tower sites) but instead may need to rely on its ability to realize on the direct and indirect equity interests of the asset holder(s) 12 pledged as security for the notes.

In embodiments of the present invention, the structure will further include lender title insurance policies in respect of the real assets of the asset holder(s) 12. Such policies in the present invention are modifications of conventional lender title insurance policies. Conventional policies are obtained by lenders on real property that is the subject of a mortgage. However, in the present invention, the real property of the asset holder(s) 12 will not be subject to mortgages. The inventive structure nevertheless utilizes title insurance contracts in a non-mortgage context.

The securitization structure 10 may also include a guarantor 18. In various embodiments, the guarantor 18 is a bankruptcy-remote special purpose entity whose purpose is to hold the equity interests of the issuer entity 14 and to guarantee repayment of the notes (e.g., guarantee all payment and other obligations of the issuers). In various embodiments the guarantor 18 pledges (e.g., grants a first priority security interest in) the equity interests of the issuer entity 14 to the indenture trustee 17 as security for the guarantee. In various embodiments, the guarantor 18 holds no assets other than the equity interests of the issuer entity 14, has no employees, is prohibited from incurring any liability, and is prohibited from acquiring any assets other than the equity interests of the issuer entity 14.

The securitization structure may also include a manager 20. The manager 20 enters into a management agreement with the issuers 12, 14 (and the immediate parents of any non-issuer asset entity 23) to perform certain services including the management of the assets of the asset holder(s) 12. The manager may be a subsidiary of the originating entity 8.

In operation, the structure 10 allows for the issuers 12, 14 to raise capital by pledging as security the equity interests of the asset holder(s) 12 without mortgaging the individual real assets of the asset holder(s) 12 (e.g., the notes will not be secured by mortgage liens on the asset holder's 12 interests (fee, leasehold or easement) in the tower sites). Although the structure 10 does not allow for foreclosure on the real assets of the asset holder(s) 12 (as in the conventional case where the real assets are subject to mortgages), the structure allows for the sale of the equity interests of the asset holder 12 upon default of the issued notes. In various embodiments, the structure 10 may include an entity that provides an insurance policy, similar to a title insurance policy, which protects the noteholders 16 against any senior liens on the assets of the asset holder(s) 12 in the event of a default. By using the structure 10 in its various embodiments, an entity may experience a credit rating uplift that it may not otherwise receive absent the securitized financing of the structure 10. It can be understood that, in various embodiments, an entity such as an investment bank may be the entity that creates the structure 10.

Figure 2:
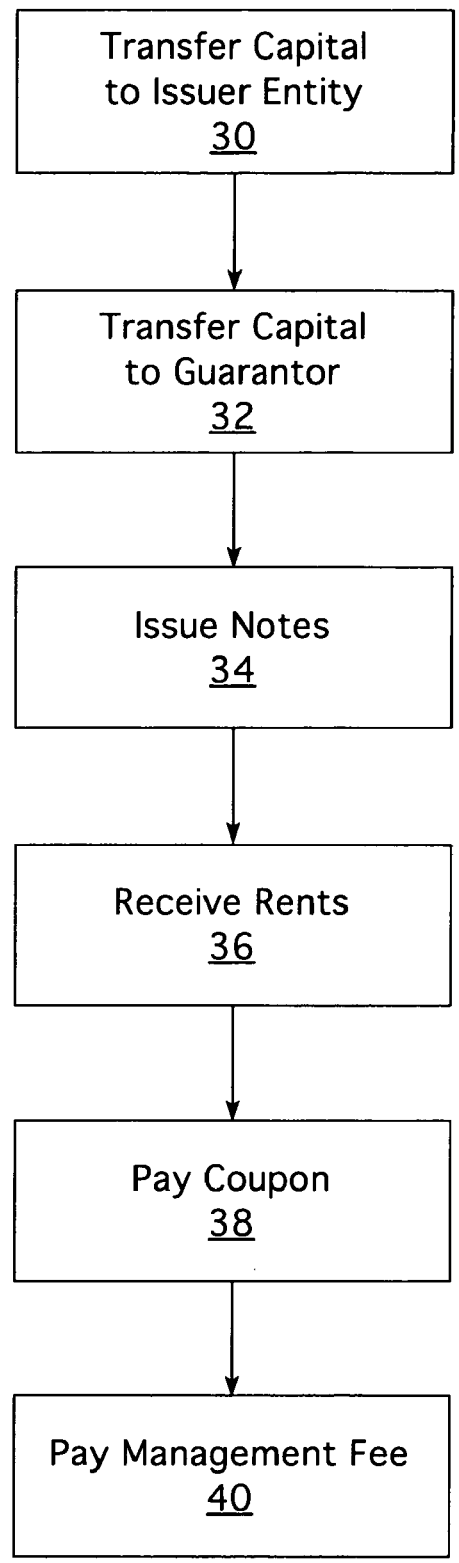
FIG. 2 is a diagram illustrating a process that may be used to raise capital for an entity holder according to one embodiment of the present invention.

FIG. 2 is a diagram illustrating a process that may be used to raise capital for the originating entity 8 according to one embodiment of the present invention. At step 30, on or before a closing date of the securitization transaction, the capital interest (i.e., shares and other equity interests) of the asset holder(s) 12 (and any affiliates) is transferred to the issuer entity 14. Such a transfer may be as a capital contribution of the originating entity 8 or other affiliate of the originating entity 8. At step 32, the capital interest of the issuer entity 14 is transferred to the guarantor 18 as a capital contribution. This may be followed by a transfer of the capital interest of the guarantor 18 to the manager 20, possibly through one or more additional intermediate SPEs. At step 34 the issuers 12, 14 issue notes backed by the assets of the asset holder(s) 12. At step 36, the asset holder(s) 12 receives rents from tenants 22 of the assets of the asset holder(s) 12. At step 38, the issuers 12, 14 make payments to the noteholders 16 according to the provisions of the notes and the indenture.

In certain embodiments, the notes (which may fixed rate and/or floating rate) may be issued in differing classes, as is well known in the art, with each class of notes having an aggregate principal balance ("Class Principal Balance"). The Class Principal Balance is reduced by the amount of any principal payments made to the noteholders 16 of each class. The Class Principal Balance of each class may be increased by the issuance of additional notes. If the originating entity 8 or a non-issuer asset holder 23 affiliate thereof acquires new assets (e.g., tower sites and related space licenses), such assets may be added to the assets supporting the notes and the issuers 12, 14 may issue new and additional notes that will rank pari passu with and be rated the same as the class to which they are associated, and will have other characteristics similar to the original notes (other than the expected maturity date thereof, which may be the same as or later than the Anticipated Repayment Date of the original notes provided that the debt service coverage ratio (DSCR) of the notes (e.g., the ratio of net cash flow from the assets for the trailing twelve months, to the amount of interest that the issuers will be required to pay over the succeeding twelve months on the principal balance of the notes) after such additional issuance is not materially less than the DSCR before such issuance). In addition, the additional notes may be issued without additional collateral, provided that the DSCR, after issuance, is not less than a specified threshold. The issuance of such additional notes may also be contingent upon prior confirmation being received from a rating agency that such issuance will not result in a downgrade, qualification or withdrawal of the then current rating for the affected class of notes. Issuers 12, 14 may also issue new notes in substitution for any notes that are pre-paid with the proceeds of the issuance of such new notes, and if the principal balance of such new notes is greater than the principal balance of the original notes being prepaid, the excess may be deemed additional notes.

In certain embodiments, payments on the notes are made by or on behalf of the indenture trustee 17 on each payment date to the noteholders of record. Payments made to noteholders 16 of the same class are allocated pro rata based on the respective principal balances with respect to payments of principal and interest due. Any prepayment of any class may be accompanied by some amount of prepayment consideration.

In certain embodiments, the tenants 22 in respect of the asset holder's 12 assets are directed to pay all rents and other amounts due to the issuers 12, 14, and the issuers 12, 14 will agree to deposit receipts to lock box accounts that are pledged to the indenture trustee 17. Tenants 22 in respect of a non-issuer asset holder 23 will make their payments to accounts that have not been pledged to the indenture trustee 17. Amounts in the lock boxes and distributions from any non-issuer asset holder 23, may be deposited into a collection account maintained by the indenture trustee 17. Amounts in the collection account will be applied on each payment date in accordance with the priority of payments set forth in the indenture.

An exemplary application of funds may be made in the following order of priority:

(i) to an Impositions and Insurance Reserve Sub-Account to reserve for the payment of real and personal property taxes and insurance premiums with respect to the assets (e.g., tower sites);

(ii) to the indenture trustee 17 and any servicer 24 (for servicing and administering the notes for the benefit of the noteholders 16) to pay its fees due on such payment date (or that remain unpaid from prior payment dates), then to payment amounts in respect of unreimbursed advances, including advance interest thereon, and then to the payment of other additional issuer expenses due on such payment date, and any and all other amounts due and payable as described in the indenture (the servicer 24 may be required to make advances in an amount equal to the excess of the Monthly Payment Amount (i.e., the amount of interest required to be paid each month in respect of the notes prior to the Anticipated Repayment Date) due over the amount of funds on deposit in the collection account and available to pay the Monthly Payment Amount. The servicer 24 may also be required to make advances to pay delinquent real and personal property taxes, assessments, ground lease rents and hazard insurance premiums, etc. If the servicer 24 fails to make a required advance, the indenture trustee 17 may be required to make the advance.);

(iii) to the holders of the most senior class of notes in respect of interest, pro rata based on the amount of Accrued Note Interest for each note on the payment date, up to an amount equal to all Accrued Note Interest in respect of each note of such senior class for such payment date and, to the extent not previously paid, for all prior payment dates ("Accrued Note Interest" means the interest on each note that accrues during each interest accrual period at the applicable note rate on the note principal balance of such note immediately outstanding prior to the related payment date; provided on or after the determination of a Value Reduction Amount, in determining the Accrued Note Interest with respect to any note, an amount equal to the Value Reduction Amount shall be deemed to have reduced the note principal balance of each class of note (beginning with the most subordinated class), and applied pro rata to each note of such class. "Value Reduction Amount" is equal to the excess, if any, of (a) the sum, without duplication, of (1) the aggregate of the outstanding Class Principal Balances of all classes of notes, (2) to the extent not previously advanced, all unpaid interest on the notes, (3) all accrued but unpaid servicing fees, indenture trustee fees, and other servicing fees, (4) all related unreimbursed debt service advances and servicing advances (plus accrued interest thereon), (5) all unreimbursed additional issuer expenses, and (6) all currently due and unpaid real estate taxes and assessments, insurance premiums and, if applicable, ground rents, over (b) an amount equal to, for example, 90% of the enterprise value of asset holder(s) 12 as determined by a valuation expert. Determination that a Value Reduction Amount exists may be made upon the servicer's 24 reasonable determination that an event of default is likely to occur, following the declaration of an event of default, or after the Anticipated Repayment Date of the notes.);

(iv) to the holders of each successively more subordinate note class in respect of interest, in the manner set forth above;

(v) to the issuers 12, 14, until the issuers 12, 14 have received an amount equal to a monthly operating expense amount for the next calendar month (e.g., the aggregate of the budgeted operating expenses of each asset holder for such calendar month);

(vi) to the manager 20 to pay any accrued and unpaid management fee;

(vii) to the issuer entity 14 to pay operating expenses of the asset holder(s) 12 in excess of the monthly operating expense amount, if any;

(viii) to an Environmental Remediation Reserve Sub-Account (to reserve for payment of potential environmental remediation costs);

(ix) prior to an Anticipated Repayment Date, if a Cash Trap Condition is continuing and an Amortization Period is not then in effect and no event of default has occurred and is continuing, any amounts remaining in the collection account ("Excess Cash Flow") will be deposited into a Cash Trap Reserve Sub-Account (as is well known in the art, a Cash Trap Condition may be triggered based on a DSCR being below a predetermined threshold amount; an Amortization Period may also be triggered based on a DSCR being below a predetermined threshold amount.);

(x) during an Amortization Period, the continuation of an event of default, or at any time on or after an Anticipated Repayment Date, any amounts remaining in the collection account, to the holders of the most senior class of notes in respect of principal pro rata based on the note principal balance, up to an amount equal to the lesser of the sum of the Class Principal Balance for such notes and a Principal Payment Amount for that payment date (a Principal Payment Amount may, for example, be defined to be: (A) zero on any payment date prior to the Anticipated Repayment Date, when no Amortization Period is in effect, and no event of default has occurred and is continuing; and (B) on a payment date during the continuation of an Amortization Period or an event of default, or on and after the Anticipated Repayment Date, the sum of (a) the Excess Cash Flow for the preceding collection period applied to payments of principal on the notes for such payment date, (b) any principal prepayments made on the notes, and (c) all other collections that were received during the preceding collection period that were identified and applied as recoveries of principal);

(xi) under the same conditions specified above and after the Class Principal Balance of the senior note class has been reduced to zero, to the holders of the next most senior note class in respect of principal pro rata based on the note principal balance of each such note, up to an amount equal to the lesser of the Class Principal Balance for that class and the excess, if any, of the Principal Payment Amount for such payment date over any amount paid on such payment date in redemption of the senior note class as specified above;

(xii) in a similar fashion to holders of respectively subordinated classes of notes in respect of principal;

(xiii) after all payments and reimbursements due to the indenture trustee 17 and the servicer 24 have been fully satisfied and after the outstanding principal balance of all classes of notes has been reduced to zero, to the holders of each class, in order of subordination, pro rata based on the aggregate amount of Accrued Note Interest for all prior accrual periods not paid to the holders as a consequence of a Value Reduction Amount, the amount of such unpaid Accrued Note Interest, with interest thereon at the applicable note rate for the notes of such class from the payment date on which each installment of such Accrued Note Interest was not paid to the date of payment thereof (such amount, the "Value Reduction Amount Interest Restoration Amount");

(xiv) after the Value Reduction Amount Interest Restoration Amount, if any, has been paid, to the holders of each class of notes, in seniority order, first, pro rata based upon the amount of Post-ARD Additional Interest due, to the payment of Post-ARD Additional Interest and then, pro rata based on the amount of Deferred Post-ARD Additional Interest due, to the payment of all Deferred Post-ARD Additional Interest due on such class of notes ("Post ARD Additional Interest" means additional interest that begins to accrue from and after the Anticipated Repayment Date on the outstanding principal balance of each class of notes at a specified interest rate. Such Additional Interest will be deferred until the outstanding principal balance of all classes of notes has been reduced to zero, and the Value Reduction Amount Interest Restoration Amount has been reduced to, or is equal to, zero ("Deferred Post-ARD Additional Interest")); and (xv) to pay any remaining amounts to, or at the direction of, the issuer entity 14.

In certain embodiments, prior to the Anticipated Repayment Date, if a Cash Trap Condition ceases to exist and if no event of default has occurred and is continuing, any funds then on deposit in the Cash Trap Reserve Sub-Account will be released to the issuer entity 14. Prior to the Anticipated Repayment Date, if a Cash Trap Condition is continuing and a certain DSCR threshold is exceeded and no event of default has occurred and is continuing, funds in the Cash Trap Reserve Sub-Account may be released to the issuer entity 14 to be used solely to meet the debt service requirements of the originating entity 8 and/or its affiliates.

Figure 3:
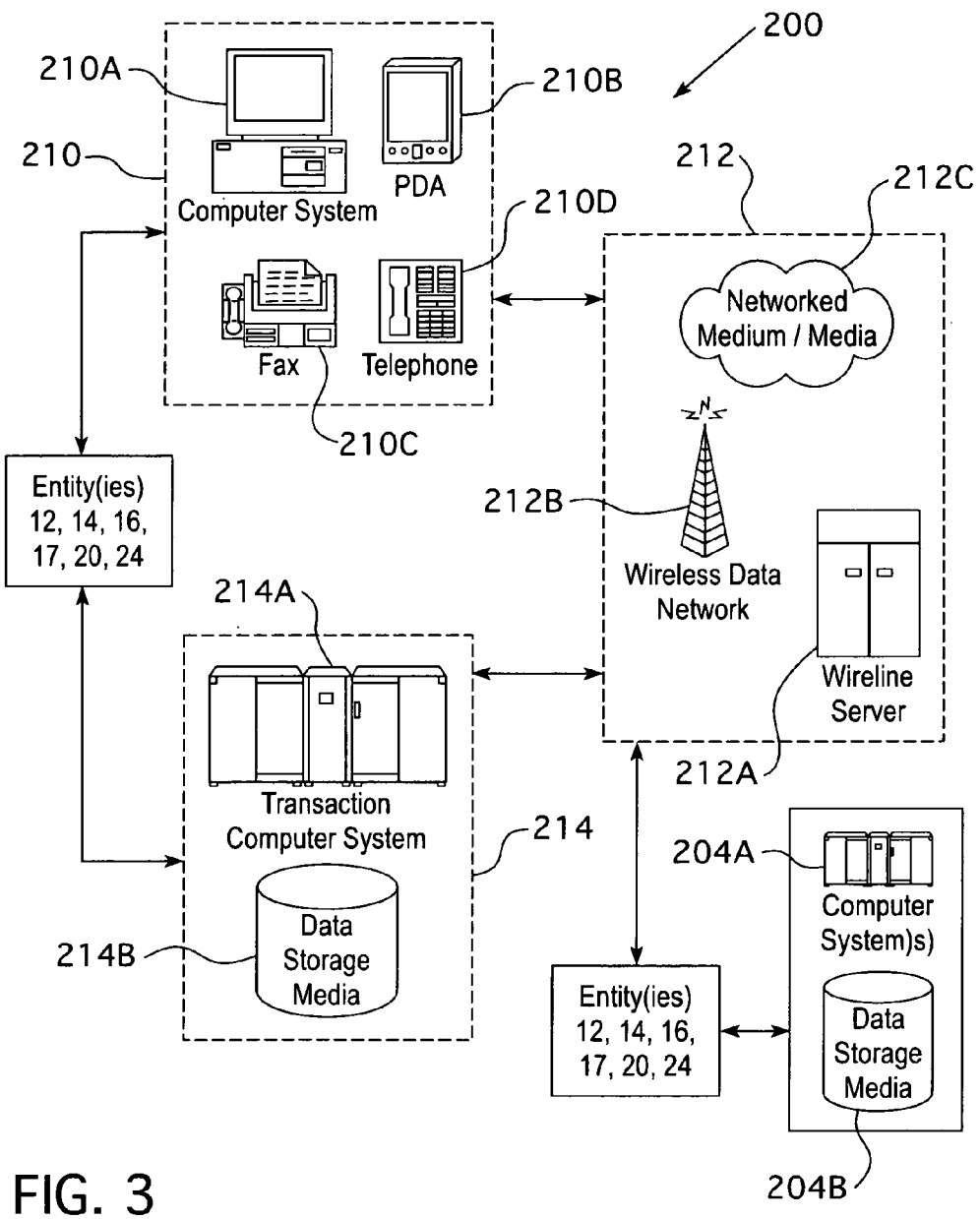
FIG. 3 is a diagram illustrating various embodiments of a system in which the present invention may be used.

FIG. 3 is a diagram illustrating various embodiments of a system 200 in which embodiments of the present invention may be used. As shown, two or more of the issuer entity 14, the asset holder(s) 12, the manager 20, the indenture trustee 17, the servicer 24 and the investors (noteholders) 16 may communicate and/or exchange data. In one aspect, two or more of the issuer entity 14, asset holder(s) 12, the manager 20, the indenture trustee 17, the servicer 24 and the investors 16 can be operatively associated with one or more communications devices 210 such as, for example and without limitation, a computer system 210A, a personal digital assistant 210B, a fax machine 210C, and/or a telephone 210D (e.g. a wireline telephone, a wireless telephone, a pager, and the like), and/or other like communication devices. The communication devices 210 may permit two or more of the aforementioned entities to communicate between/among each other through one or more communication media 212, such as by use of electronic mail communication through one or more computer systems, for example. The communication media 212 can include, for example and without limitation, wireline communication means such as a wireline server 212A, a wireless data network 212B, and/or a connection through a networked medium or media 212C (e.g., the Internet). In addition, the two or more of the aforementioned entities may be operatively associated with one or more data processing/storage devices 214.

As illustrated in FIG. 3, one of the aforementioned entities may be operatively associated with a transaction computer system 214A, for example, and/or one or more data storage media 214B that can receive, store, analyze and/or otherwise process data and other information in association with communications that occur between/among other of the aforementioned entities. In another aspect, one of the aforementioned entities may be operatively associated with one or more computer systems 204A and/or one or more data storage media 204B.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

The various portions and components of various embodiments of the present invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A computer-implemented method of facilitating securitizing real assets owned by one or more issuing asset holders, the method comprising:

receiving a transfer by an issuing entity of equity interests of the one or more issuing asset holders;

issuing by the issuing entity and the one or more issuing asset holders to noteholders one or more classes of notes, wherein principal and interest obligations of the notes are to be paid from fees paid by third parties to the one or more issuing asset holders under agreements for use of the real assets by the third parties;

receiving fees, via a transaction computer system, paid by the third parties under the agreements for use of the real assets;

paying, via the transaction computer system, payment obligations of the notes;

granting from the one or more issuing asset holders to an indenture trustee for the benefit of holders of the notes, a first security interest in (i) assignable personal property of the one or more issuing asset holders, (ii) the agreements for use of the real assets, and (iii) the fees paid to the one or more issuing asset holders pursuant to the agreements; and pledging from the issuing entity to the indenture trustee for the benefit of the holders of the notes, the issuing entity's equity interests in the one or more issuing asset holders as security for repayment of the notes, without mortgaging the real assets of the one or more asset holders, such that, in the event of a default on the notes, the equity interests of the one or more asset holders can be sold without the real assets being able to be foreclosed upon by the indenture trustee, wherein the transaction computer system is connected to a data communication network.

2. The method of claim 1, wherein:

the real assets comprise real property sites; and the agreements for use of real assets comprise rent agreements for use of the real property sites.

3. The method of claim 2, wherein the real property sites comprise wireless communication towers.

4. The method of claim 3, wherein the one or more issuing asset holders and the issuing entity are special purpose entities.

5. The method of claim 1, wherein:

the principal and interest obligations of the notes are to be paid from, in addition to the fees paid by third parties to the one or more issuing asset holders under agreements for use of the real assets by the third parties, fees paid to one or more non-issuing asset holders, wherein the non-issuing asset holders own real assets and the fees are pursuant to agreements for use of the real assets of the non-issuing asset holders, and wherein the non-issuing asset holders are restricted from issuing debt obligations; and wherein the issuing entity additionally pledges its equity interests in the one or more non-issuing asset holders to the indenture trustee holders as security for repayment of the notes.

6. The method of claim 5, wherein the equity interests of the issuing entity in the one or more non-issuing entities comprise direct and indirect equity interests.

7. The method of claim 5, wherein a guarantor holds the equity interests pledged by the issuing entity.

8. The method of claim 1, wherein the issuing entity and the indenture trustee are in communication via the data communication network.

9. The method of claim 1, wherein the one or more issuing asset holders deposit the fees received from the third parties in lock box accounts that are pledged to the indenture trustee for payment of the principal and interest obligations of the notes.

10. The method of claim 1, wherein at least one title insurance policy exists to protect the noteholders against any senior liens on the real assets of the asset holders in the event of default.

11. A computer-implemented method of facilitating securitizing real assets, the method comprising:

receiving a transfer by an issuing entity of equity interests of one or more issuing asset holders that own the real assets;

issuing by the issuing entity and the one or more issuing asset holders to noteholders one or more classes of notes, wherein principal and interest obligations of the notes are to be paid from (i) fees paid to the one or more issuing asset holders under agreements for use of the real assets of the issuing asset holders and (ii) fees paid to one or more non-issuing asset holders under agreements for use of real assets of the non-issuing asset holders, wherein the non-issuing asset holders are restricted from issuing the notes, and wherein the issuing entity own equity interests in the non-issuing asset holders;

receiving fees, via a transaction computer system, paid by the third parties under the agreements for use of the real assets;

paying, via the transaction computer system, payment obligations of the notes;

granting from the one or more issuing asset holders to an indenture trustee for the benefit of holders of the notes, a first security interest in (i) assignable personal property of the one or more issuing asset holders, (ii) the agreements for use of the real assets, and (iii) fees paid to the one or more issuing asset holders pursuant to the agreements; and pledging from the issuing entity to the indenture trustee for the benefit of the holders of the notes, as security for repayment of the notes, (i) the issuing entity's equity interests in the one or more issuing asset holders and (ii) the issuing entity's equity interests in the one or more non-issuing asset holders, without mortgaging the real assets of the one or more issuing asset holders, such that, in the event of a default on the notes, the equity interests of the one or more issuing asset holders can be sold without the real assets of the one or more issuing asset holders being able to be foreclosed upon by the indenture trustee;

wherein the transaction computer system is connected to a data communication network.

12. The method of claim 11, wherein:

the real assets of the issuing asset holders and the non-issuing asset holders comprise real property sites; and the agreements for use of real assets comprise rent agreements for use of the real property sites.

13. The method of claim 12, wherein the real property sites comprise wireless communication towers.

14. The method of claim 11, wherein the one or more issuing asset holders and the issuing entity are special purpose entities.

15. The method of claim 11, wherein a guarantor holds the equity interests pledged by the issuing entity.

16. The method of claim 11, wherein the issuing entity and the indenture trustee are in communication via the data communication network.

17. The method of claim 11, wherein the one or more issuing asset holders and the one or more non-issuing asset holders deposit the fees received in lock box accounts that are pledged to the indenture trustee for payment of the principal and interest obligations of the notes.

18. The method of claim 11, wherein at least one title insurance policy exists to protect the noteholders against any senior liens on the real assets of the asset holders in the event of default.

* * * * *